United States Patent [19]

Chen

[11] Patent Number: 5,398,017
[45] Date of Patent: Mar. 14, 1995

[54] AUTOMOBILE STEERING LOCK WITH A SOUND WARNING DEVICE

[76] Inventor: Tian-Yuan Chen, No. 95-4, Min-Hsiang Rd. Chung-Ho, Taipei Hsien, Taiwan, Prov. of China

[21] Appl. No.: 27,061

[22] Filed: Mar. 4, 1993

[51] Int. Cl.⁶ ............................................. B60R 25/10
[52] U.S. Cl. ................................... 340/426; 340/429; 340/693; 307/10.2
[58] Field of Search .............. 340/426, 429, 546, 531, 340/693, 425.5; 307/10.2, 10.1; 70/209, 210, 211–214, 225, 226, 237, 454

[56] References Cited

U.S. PATENT DOCUMENTS

| | | | |
|---|---|---|---|
| 5,055,823 | 10/1991 | Fuller | 340/426 |
| 5,128,649 | 7/1992 | Elmer | 340/426 |

FOREIGN PATENT DOCUMENTS

| | | | |
|---|---|---|---|
| 2580243 | 4/1985 | France | 340/426 |

*Primary Examiner*—Donnie L. Crosland

[57] ABSTRACT

An anti-theft device with a sound warning device for attachment to the steering wheel of an automobile comprising a sound warning device deposited in an inner cavity in an elongate rod of the steering lock, the sound warning device consisting of a case, an electronic circuit board contained in the case and having electronic components to send out a signal to a sound system of the automobile to give out a warning sound in case the body or the steering wheel should be touched by a would-be burglar, and a cover closing on the case in the cavity in the rod.

1 Claim, 2 Drawing Sheets

AUTOMOBILE STEERING LOCK WITH A SOUND WARNING DEVICE

BACKGROUND OF THE INVENTION

At present, most anti-theft device for attachment to the steering wheel of an automobile have no sound warning device, liable to be forcefully pried open by tools.

SUMMARY OF THE INVENTION

This invention has been devised to offer an anti-theft device with a sound warning device for attachment to the steering wheel of an automobile, controlled by a remote controller, enabling a sound warning system in an automobile be started by the sound warning device in case the body or the steering wheel of an automobile should be touched by would-be burglar.

The sound warning device in the present invention is deposited in a cavity provided in an elognate rod of a steering lock, having a case, an electronic circuit board mounted in the case, and a cover to close on the case with the circuit board in the cavity of the elongate rod.

DETAILED DESCRIPTION OF THE INVENTION

Figure 1:
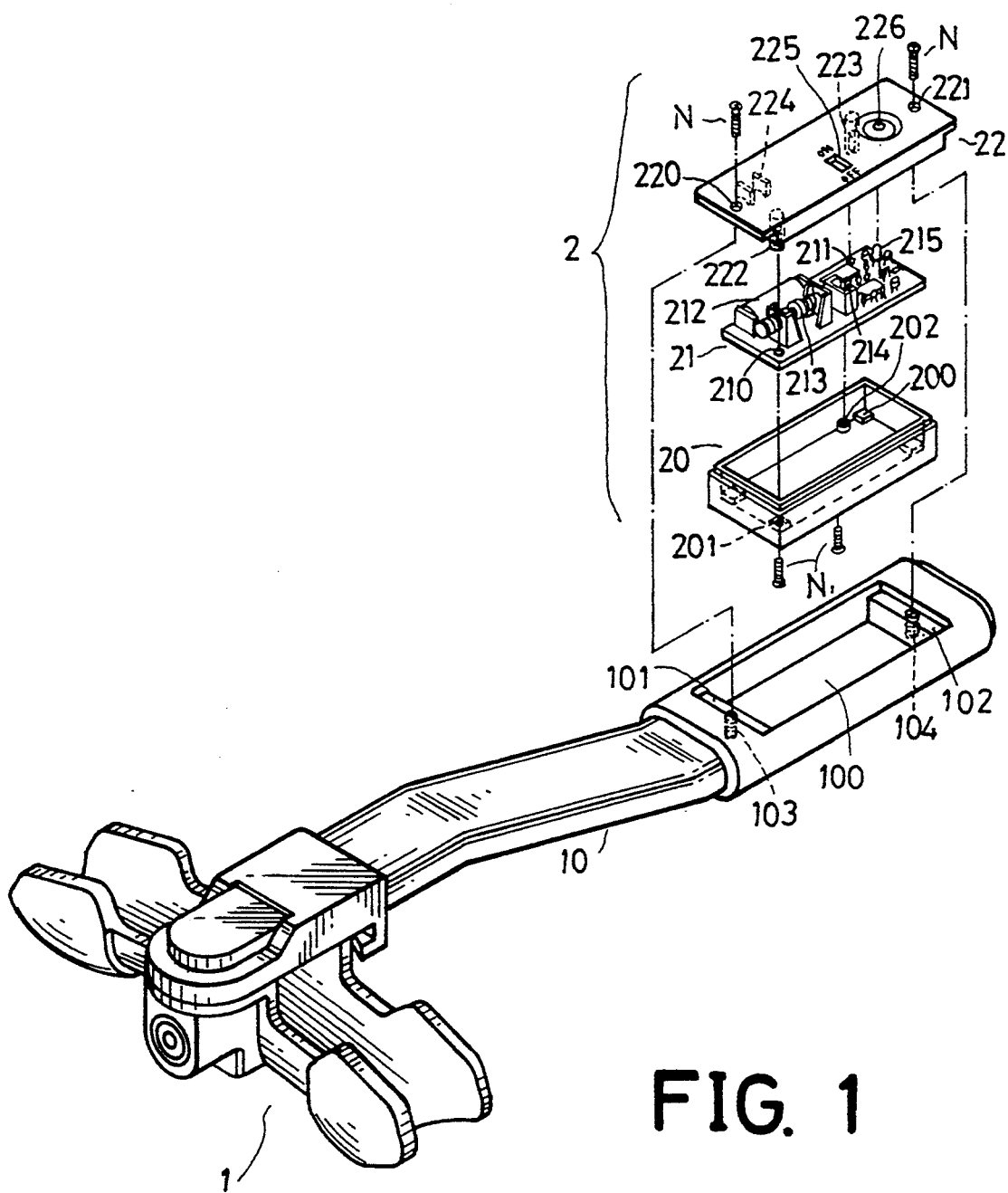
FIG. 1 is an exploded perspective view of an anti-theft device with a sound warning device for attachment the steering wheel of an automobile in the present invention.

An anti-theft device with a sound warning device for attachment to the steering wheel of an automobile in the present invention, as shown in FIG. 1, comprises a steering lock 1 and a sound warning device 2. An elongate rod 10 the steering lock 1 has an inner cavity 100 in an end portion, two opposite stairs 101,102, and two threaded holes 103, 104 in the stairs 101, 102.

The sound warning device 2 has a case 20, an electronic circuit board 21 and a cover 22 assembled together, and mounted in the cavity 100 of the elongate rod 10 and screwed with two screws N, N1. In the case 20 are provided four small cushions 200 in Four corners. One of the four cushions 200 has a round hole 201, and two tubular posts 202 are provided near two diagonal corners. The electronic circuit board 21 is placed in the case 20, laid on the four cushions 220, having round holes 210, 211 corresponding to the hole 201 and the tubular posts 202, and a power source base 212, a tremble sensor 213, a switch 214, a power signal lamp 215, etc. are mounted on the circuit board 21 and connected together for controlling a sound system in an automobile. The cover 22 has the same shape as the cavity 100, two round holes 220, 221 corresponding to the threaded holes 1034, 104, and two threaded tubular posts 222, 223 corresponding to the holes 201 and tubular posts 202 of the case 20, a pair of support plates 224 for the power source base 212, a rectangular hole 225 for the switch 214 and a through hole 226 for the power signal lamp.

Figure 2:
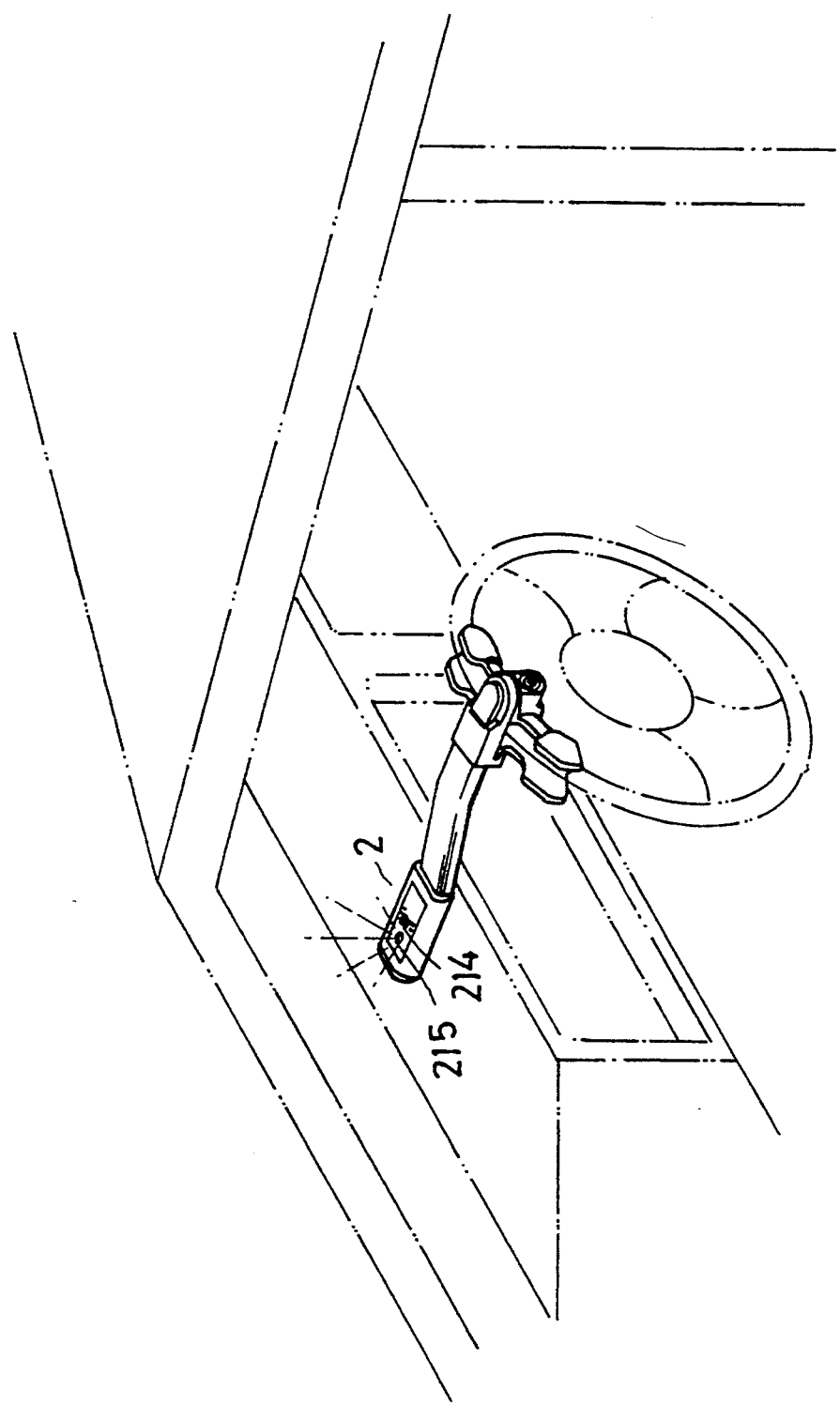
FIG. 2 is a perspective view of the anti-theft device with a sound warning device for attachment to the steering wheel of an automobile in the present invention.

After this lock is locked on the steering wheel of an automobile, the switch 214 of the sound warning device 2 is to be turned ON to light up the power signal lamp 215 showing the whole device in electrified condition, and then a remote controller is operated to turn the device 2 in a warning condition as shown in FIG. 2. Then if a burglar should touch the body or the steering wheel, the device 2 would send out a signal by sensing a tremble caused by the burglar, starting the sound system to give out warning sound to surprise the burglar. To cancel the warning condition of the device 2, the remote controller is to be operated to turn the device 2 out of the warming condition, and then the switch 214 is to be turned OFF.

What is claimed is:

1. An anti-theft device with a sound warning device for attachment to a steering wheel of an automobile comprising:

a sound warning device mounted in an inner cavity in an elongate rod of a steering wheel lock, said sound warning device including a case, an electronic circuit board mounted therein, and a cover to close the case and protect the circuit board, the circuit board including components which send a signal to a sound system in the automobile to emit a warning sound in case a would-be burglar touches the body or steering wheel of the automobile, and wherein the elongate rod is positioned perpendicular to the plane in which the steering wheel lies, so that the rod contacts a dashboard of the automobile and the steering wheel simultaneously, so that turning of the steering wheel is prohibited.

* * * * *